(12) United States Patent
Goetz (10) Patent No.: US 11,763,572 B2
(45) Date of Patent: Sep. 19, 2023

(54) SYSTEM AND METHOD FOR AUTOMATICALLY GENERATING A VIDEO OF A TRIP

(71) Applicant: Bayerische Motoren Werke Aktiengesellschaft, Munich (DE)

(72) Inventor: Philipp Goetz, Petershausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 175 days.

(21) Appl. No.: 17/427,325

(22) PCT Filed: Jan. 15, 2020

(86) PCT No.: PCT/EP2020/050862
§ 371 (c)(1),
(2) Date: Jul. 30, 2021

(87) PCT Pub. No.: WO2020/192975
PCT Pub. Date: Oct. 1, 2020

(65) Prior Publication Data
US 2022/0139091 A1    May 5, 2022

(30) Foreign Application Priority Data
Mar. 26, 2019   (DE) .................... 10 2019 107 717.6

(51) Int. Cl.
*G06V 20/58* (2022.01)

(52) U.S. Cl.
CPC .................... *G06V 20/58* (2022.01)

(58) Field of Classification Search
CPC ...... G06V 20/58; G06V 5/0866; G06V 20/56; G06V 20/597; G06V 10/82; G06V 20/64;
(Continued)

(56) References Cited

U.S. PATENT DOCUMENTS

| | | | |
|---|---|---|---|
| 2015/0211879 A1* | 7/2015 | Nomura | H04W 4/024 701/523 |
| 2016/0029106 A1* | 1/2016 | Chen | G11B 27/031 386/282 |

(Continued)

FOREIGN PATENT DOCUMENTS

| | | |
|---|---|---|
| AT | 13867 U1 | 10/2014 |
| CN | 102724482 A | 10/2012 |

(Continued)

OTHER PUBLICATIONS

International Search Report (PCT/ISA/210) issued in PCT Application No. PCT/EP2020/050862 dated Mar. 11, 2020 with English translation (five (5) pages).

(Continued)

*Primary Examiner* — Nimesh Patel
(74) *Attorney, Agent, or Firm* — Crowell & Moring LLP (57) ABSTRACT

A system for automatically generating a video of a trip includes at least two vehicles, each vehicle having at least one sensor configured to continuously detect technical driving parameters of the vehicle, and at least one video camera configured to continuously record video sequences of a pre-definable length. The system also includes at least one computing unit which is configured to process the video sequences with reference to the technical driving parameters, to mark each of the processed video sequences according to pre-definable criteria, and to automatically generate a video on the basis of the markings.

6 Claims, 5 Drawing Sheets

(58) Field of Classification Search
CPC .... G06V 10/764; G06V 20/59; G06V 20/584; G06V 20/588; G06V 20/52; G06V 20/44; G06V 40/161; G06V 10/774; G06V 10/40; G06V 10/776; G06V 20/46; G06V 20/54; G06V 20/582; G06V 20/63; G06V 30/184; G06V 40/10; G06V 40/20; G06V 10/24; G06V 10/242; G06V 30/194; G07C 5/008; G07C 5/02; G07C 5/08; G07C 5/0816; G07C 5/0808; G07C 5/0891; G07C 5/0866; G07C 5/0841; G07C 9/27; G07C 9/28; G07C 1/10; G07C 2009/0092; G07C 9/38; G07C 5/085; B60R 11/04; B60R 1/00; B60R 2300/30; B60R 2300/607; B60R 2300/8066; B60R 2300/105; B60R 2001/1253; B60R 2300/302; B60R 2300/301; B60R 2001/1215; B60R 2300/106; B60R 2300/303; B60R 2300/8093; B60R 2300/70; B60R 25/08; B60R 1/04; B60R 1/081; B60R 16/023; B60R 2021/01259; B60R 21/01538; B60R 2300/207; B60R 2300/103; B60R 2300/305; B60R 2300/402; B60R 2300/50; B60R 2300/60; B60R 2300/80; B60R 2300/8006; B60R 2300/802; G06N 3/045; G06N 3/08; G06N 20/00; G06N 3/02; G06N 3/048; G06N 3/044; G06N 3/086; G06N 3/042; G06N 3/049; G06N 3/04; G06N 3/063; G06N 3/088; G08G 1/0175; G08G 1/20; G08G 1/162; G08G 1/017; G08G 1/123; G08G 1/01; G08G 1/0133; G08G 1/0112; G08G 1/166; G08G 1/16; G08G 1/167; G08G 1/143; G08G 1/091; G08G 1/0962; G08G 1/096783; G08G 1/096791; G08G 1/205; H04L 67/025; H04L 9/40; H04L 25/0254; H04L 67/125; H04L 9/32; G06T 2207/20084; G06T 7/20; G06T 7/593; G06T 13/20; G06T 17/00; G06T 2207/30248; G06T 2207/30256; G06T 7/11; G06T 7/246; G06T 7/32; H04W 4/08; H04W 4/02; H04W 4/029; H04W 4/38; B60T 2210/32; B60T 7/22; B60T 2201/08; B60T 7/18; B60T 8/172; B60T 8/4266; B60T 8/4863; B60T 2201/022; B60T 2201/02; B60T 2201/03; B60T 2201/087; B60T 2201/089; B60T 2201/12; B60T 2210/14; B60T 2210/13; B60T 2220/02; B60T 8/175; B62D 1/046; B62D 1/06; B62D 15/025; B62D 15/0265; B62D 15/029; B62D 55/065; B62D 6/00

See application file for complete search history.

(56) References Cited

U.S. PATENT DOCUMENTS

| 2016/0371553 | A1* | 12/2016 | Farnham, IV | ........... G08G 1/04 |
| 2019/0115049 | A1* | 4/2019 | Shinoda | .................. H04N 5/77 |
| 2020/0273492 | A1* | 8/2020 | Goetz | .................. G11B 27/34 |

FOREIGN PATENT DOCUMENTS

| CN | 104854639 A | 8/2015 |
| DE | 10 2012 003 981 A1 | 8/2013 |
| DE | 10 2013 019 201 A1 | 5/2015 |
| DE | 11 2013 004 890 B4 | 8/2018 |
| WO | WO 2014/083410 A1 | 6/2014 |

OTHER PUBLICATIONS

German-language Written Opinion (PCT/ISA/237) issued in PCT Application No. PCT/EP2020/050862 dated Mar. 11, 2020 (six (6) pages).

German-language Office Action issued in German Application No. 10 2019 107 717.6 dated Dec. 2, 2019 (6 pages).

Chinese-language Office Action issued in Chinese Application No. 202080012101.4 dated Apr. 23, 2023 with English translation (12 pages).

* cited by examiner

SYSTEM AND METHOD FOR AUTOMATICALLY GENERATING A VIDEO OF A TRIP

BACKGROUND AND SUMMARY OF THE INVENTION

The present invention relates to a system and a method for automatically creating a meaningful video of a journey.

Modern vehicles comprise a plurality of sensors that, for example, play a role in the provision of driver assistance systems in order to intervene partly autonomously or autonomously in the drive, the control and/or signaling devices of the vehicle. By way of example, the sensors may comprise video cameras, position ascertainment units, lidar sensors, radar sensors, etc. The measurement variables captured by the sensors are processed and exploited for the use of the driver assistance systems.

In some driving situations, for example when driving on racetracks and/or within the scope of driver training, a driver of the vehicle may be interested in suitable recordings for analyzing their own journey.

The object of the invention consists of using sensors present in the vehicle to automatically create a video for analyzing a journey.

This object is achieved by the claimed invention.

The aforementioned object is achieved by a system for automatically creating a video of a journey, comprising:
- at least two vehicles, each vehicle comprising:
  - at least one sensor which is set up to continuously capture technical driving parameters of the vehicle; and
  - at least one video camera which is set up to record continuous video sequences of a predefinable length;
- at least one computing unit which is set up
  - to process the video sequences with reference to the technical driving parameters;
  - to mark each of the processed video sequences on the basis of predefinable criteria; and
  - to automatically create a video on the basis of the markings.

The term vehicle comprises automobiles, trucks, buses, RVs, motorcycles etc. that are used to transport people, goods, etc. The term in particular comprises motor vehicles for passenger transport. Motor vehicles comprise vehicles with electric or at least partly electric drive.

The system comprises at least two vehicles. Each vehicle comprises at least one sensor which is set up to continuously capture technical driving parameters of the respective vehicle. Moreover, each vehicle comprises at least one video camera which is set up to record continuous video sequences of a predefinable length. In this case, continuously comprises, for example, during a journey, upon predefined events—e.g., from a start event—and/or upon predefined events. The length of the video sequences may be predefinable in different ways, for example may relate to the length of a journey, to a length defined by a user of the vehicle (e.g., between active activation and deactivation of the video camera by the driver and/or another user), etc.

The video camera, the at least one sensor and/or the computing unit may be fixedly integrated in the vehicle. The at least one video camera may record videos of the vehicle surround. In this case, the video camera may be arranged in the vehicle in such a way that the video camera is able to record video sequences in the driving direction such that video sequences of a route traveled by the vehicle may be recorded in the driving direction. Moreover, the vehicle may comprise one or more further video cameras which are set up to record continuous video sequences of a predefinable length. These video cameras may be arranged in the vehicle in such a way that they are able to record video sequences of the driver of the vehicle and/or of the vehicle surround.

Moreover or as an alternative thereto, the video camera, the at least one sensor and/or the computing unit may be integrated into the vehicle via a mobile terminal. A mobile terminal is a device that is capable of communicating wirelessly in a mobile network via local area networks (LANs), such as for example Wireless Fidelity (WiFi), or via wide area networks (WANs) such as for example Global System for Mobile Communication (GSM), General Package Radio Service (GPRS), Enhanced Data Rates for Global Evolution (EDGE), Universal Mobile Telecommunications System (UMTS), High Speed Downlink/Uplink Packet Access (HSDPA, HSUPA), Long-Term Evolution (LTE), fifth generation mobile radio networks (5G), or World Wide Interoperability for Microwave Access (WIMAX). Communication using other present or future communication technologies is possible. The term mobile terminal in particular includes smartphones, but also other cellular telephones, personal digital assistants (PDAs), tablet PCs and all present and future electronic devices that are equipped with technology for loading and executing apps.

In this example, a mobile terminal may be placed in the vehicle such that the front and/or rear camera of the vehicle are/is able to record video sequences of the vehicle interior or driver and/or of the vehicle surround. By way of example, the mobile terminal may be installed in the vehicle such that the front camera of the mobile terminal is able to record video sequences of the driver of the vehicle, whereas the rear camera of the mobile terminal is able to record video sequences of the vehicle surround. The mobile terminal may be connected to the vehicle in a wired and/or wireless manner.

The computing unit may comprise the computing unit of the mobile terminal. The technical driving parameters may be captured at least by a sensor of the mobile terminal. Moreover or as an alternative thereto, the technical driving parameters may be captured by at least one sensor of the vehicle. The sensor data may be transmitted from the vehicle to the mobile terminal in a wired and/or wireless manner.

Moreover or as an alternative thereto, the computing unit may be located in the vehicle. In this example, the technical driving parameters and/or the video sequences—in the aforementioned case where they were captured by the mobile terminal—may be transmitted from the mobile terminal to the computing unit of the vehicle in a wired or wireless manner.

Moreover or as an alternative thereto, a backend server may comprise the computing unit. In this case, the technical driving parameters and the video sequences may be transmitted from the vehicle and/or from the mobile terminal to the backend server. In this example, the vehicle and/or the mobile terminal may comprise a communication module. The communication module is capable of establishing a communication connection with other communication subscribers, for example other vehicles, the backend server, mobile terminals, etc., in order to transmit data. The communication module may be a subscriber identity module or a SIM card (not shown) that serves to establish a communication connection via a mobile radio system. The subscriber identity module in this case uniquely identifies the communication module in the mobile radio network. The communication connection may be a data connection (for example packet transmission) and/or a wired communication connection (for example line transmission). A wireless communication connection with other communication subscribers via the communication module may also be established using other present and future technologies, for example local area networks (LANs) such as for example wireless LANs, etc.

The at least two vehicles and/or the mobile terminal or terminals belonging to the at least two vehicles may consequently be set up to transmit the technical driving parameters and the video sequences to the computing unit of the backend server during and/or a journey.

The provision of the computing unit via the backend server is advantageous in that, following a common journey, a plurality of vehicles may transmit the technical driving parameters and the recorded video sequences to the backend server, where these may then be processed together accordingly by the computing unit and be automatically combined to form one or more suitable videos. In this case, the transmission of the technical driving parameters, the recorded video sequences and possible further relevant data may advantageously be implemented by way of a wireless access point by way of a wireless communication connection, independently of the network coverage of the mobile radio network available at the respective time. The computing unit of the backend server may automatically create a suitable video for each vehicle.

The computing unit is set up to process each of the video sequences with reference to the captured technical driving parameters.

Moreover, the computing unit is set up to mark each of the processed video sequences on the basis of predefinable criteria.

The computing unit is set up to automatically create a video on the basis of the markings.

The predefinable or predefined criteria may comprise, for example, a marking of a vehicle which is situated directly behind the vehicle to be analyzed or is traveling behind the vehicle to be analyzed.

It is thus advantageously possible to automatically create a video that contains video sequences of the vehicle to be analyzed, which are recorded directly by the vehicle situated behind the vehicle to be analyzed. This facilitates a convenient analysis of the driving style of the driver of the vehicle to be analyzed.

The at least one sensor preferably comprises a position ascertainment sensor, wherein the continuous capture of technical driving parameters of the respective vehicle comprises the capture of a geographic position of the respective vehicle.

To capture or ascertain the geographic position, a position ascertainment sensor may ascertain or capture current position data with the aid of a navigation satellite system. The navigation satellite system may be any current or future global navigation satellite system (GNSS) for position determination and navigation by receiving signals from navigation satellites and/or pseudolites. By way of example, this may be the Global Positioning System (GPS), GLObal NAvigation Satellite System (GLONASS), Galileo positioning system and/or BeiDou Navigation Satellite System. In the example of GPS, the the position ascertainment sensor may comprise a GPS module which is set up to ascertain current GPS position data of the vehicle or of the mobile terminal belonging to a vehicle.

Moreover, the at least one sensor may comprise an accelerometer. An accelerometer is a sensor which determines acceleration by measuring inertia acting on a mass or test mass. By way of example, the accelerometer may ascertain the acceleration, an increase or decrease in speed and/or a driving direction of the vehicle.

Moreover or as an alternative thereto, the at least one sensor may comprise a gyro sensor. A gyro sensor is an accelerometer or relative position sensor that captures very small accelerations, rotational movements and/or a change in relative position of a mass or test mass. Data from the gyro sensor may be combined with position data from the position ascertainment sensor. By combining gyro sensor and position ascertainment sensor, it is possible for example to very accurately determine changes in direction.

An electronic controller may process all signals of the aforementioned sensor or sensors and output appropriate control signals to suitable actuators.

The aforementioned sensors consequently capture technical driving parameters. Expressed differently, technical driving parameters comprise one or more of the data captured by the aforementioned sensors.

Preferably, the position ascertainment sensor of one vehicle is synchronous in time with the position ascertainment sensor of every other vehicle.

By way of example, the at least two vehicles may carry out time synchronization at the start of every journey with an accuracy of, e.g., up to 0.1 s (seconds), 0.01 s or 0.001 s.

This is advantageous in that the video sequences recorded by the respective vehicles are synchronous in time. Consequently, video sequences of a common journey recorded by different vehicles may be combined automatically in time-synchronous fashion on the basis of pre-definable or pre-defined criteria, in order to form a video.

Preferably, processing each video sequence comprises:
ascertaining a driving direction of each vehicle;
calculating a circle with a radius r around the ascertained geographic position of each vehicle; and
calculating a greatest intersection between in each case two calculated circles of vehicles with the same ascertained driving direction.

The system comprises at least two vehicles which may carry out a common journey. By way of example, the at least two vehicles may carry out a common journey on a racetrack by virtue of carrying out the journey in convoy in the driving direction. The common journey may also comprise one or more overtaking maneuvers of the at least two vehicles. By way of example, a first vehicle may initially travel on the racetrack as "first" vehicle, with at least one vehicle, but possibly also a plurality of vehicles, following the "first" vehicle—for example in a line. After a predeterminable or predetermined interval and/or after a predeterminable or predetermined distance traveled (e.g., 1 kilometer, one or more laps, etc.), a following vehicle, e.g., the back vehicle in the convoy, may start an overtaking maneuver and overtake one or more of the vehicles ahead in order to return into a line—e.g., in front of the previous "first" vehicle—following the overtaking maneuver and adopt the position of the new "first" vehicle.

The drivers of the respective vehicles and/or further persons may have an interest in analyzing the journeys of the respective vehicles. One option to this end may comprise displaying video sequences taken in the forward direction by vehicles respectively behind the vehicle of interest in the driving direction, since these video sequences allow conclusions to be drawn about the line of the respective vehicles taken along the path. To this end, the respectively right video sequences are automatically combined to form a video—depending on the number of overtaking maneuvers that are or were carried out during a journey.

To this end, the current position and the driving direction of each vehicle is initially ascertained or calculated for all vehicles from the sensor data. By way of example, the position may be ascertained by the position ascertainment sensor and the driving direction may be ascertained from the accelerometer in combination with the position ascertainment sensor and/or from the gyro sensor in combination with the position ascertainment sensor. In a next step, a circle with radius r is calculated for each vehicle around the ascertained geographic position of each vehicle. In a next step, the greatest intersection between two calculated circles of the vehicles with the same ascertained driving direction is calculated in each case. From these variables, it is possible to accurately ascertain which vehicle Y was situated directly behind which vehicle X at what times during the journey. From the variables ascertained or calculated thus, it is possible to automatically identify those video sequences which were respectively recorded at a given time t by the vehicle situated directly behind the vehicle X in the driving direction for said vehicle X at all times during the journey. These may then automatically be combined along the time axis or the timeline in time-synchronous fashion to form a video.

Preferably, marking the processed video sequences comprises marking each video sequence as belonging to a vehicle.

Each video sequence comprises a plurality of metadata. Automatically capturing and storing metadata regarding digital photo and video files is known. Metadata comprise for example a recording date of the respective image along a timeline of a video file. Metadata may furthermore comprise information about an orientation of the camera, a resolution, a GPS position, and the camera settings that are used, etc.

Processing each video sequence with reference to the captured technical driving parameters comprises complementing the metadata over the time axis with at least one technical driving parameter that was captured by the at least one sensor. The term "over the time axis" in particular means that the metadata of the respective frames of a video sequence are complemented by the respective technical driving parameters in time synchronous fashion.

Advantageously, this allows video sequences belonging to a vehicle X to be marked and consequently be related to one another automatically on the basis of the technical parameters.

Advantageously, marking the video sequences may implement an automatic selection of the processed video sequences for the creation of the video of the journey of the vehicle X in time synchronous fashion.

According to a second aspect, the underlying object is achieved by a method for automatically creating a video of a journey of at least two vehicles, comprising:
continuously capturing technical driving parameters of the at least two vehicles by way of at least one sensor of each vehicle;
continuously recording video sequences of a predefinable length by way of at least one video camera of each vehicle;
processing each of the recorded video sequences with reference to the captured technical driving parameters by way of a computing unit;
marking each of the processed video sequences on the basis of predefinable criteria by way of the computing unit; and
automatically creating a video of the journey of at least one vehicle on the basis of the marked video sequences by way of the computing unit.

Preferably, the at least one sensor comprises a position ascertainment sensor, wherein the continuous capture of technical driving parameters of the vehicle comprises the capture of a geographic position of the respective vehicle.

Preferably, the position ascertainment sensor of one vehicle is synchronous in time with the position ascertainment sensor of every other vehicle.

Preferably, the processing of each video sequence with reference to the captured technical driving parameters comprises:
ascertaining a driving direction of each vehicle;
calculating a circle with the radius r around the ascertained geographic position of each vehicle; and
calculating a greatest intersection between in each case two calculated circles of vehicles with the same ascertained driving direction.

Preferably, marking the processed video sequences comprises marking each video sequence as belonging to a determinable or determined vehicle.

These and other objects, features and advantages of the present invention will become clearer upon studying the following detailed description of preferred embodiments and the accompanying figures. It is apparent that—although embodiments are described separately—individual features thereof may be combined to form additional embodiments.

DETAILED DESCRIPTION OF THE DRAWINGS

Figure 1:
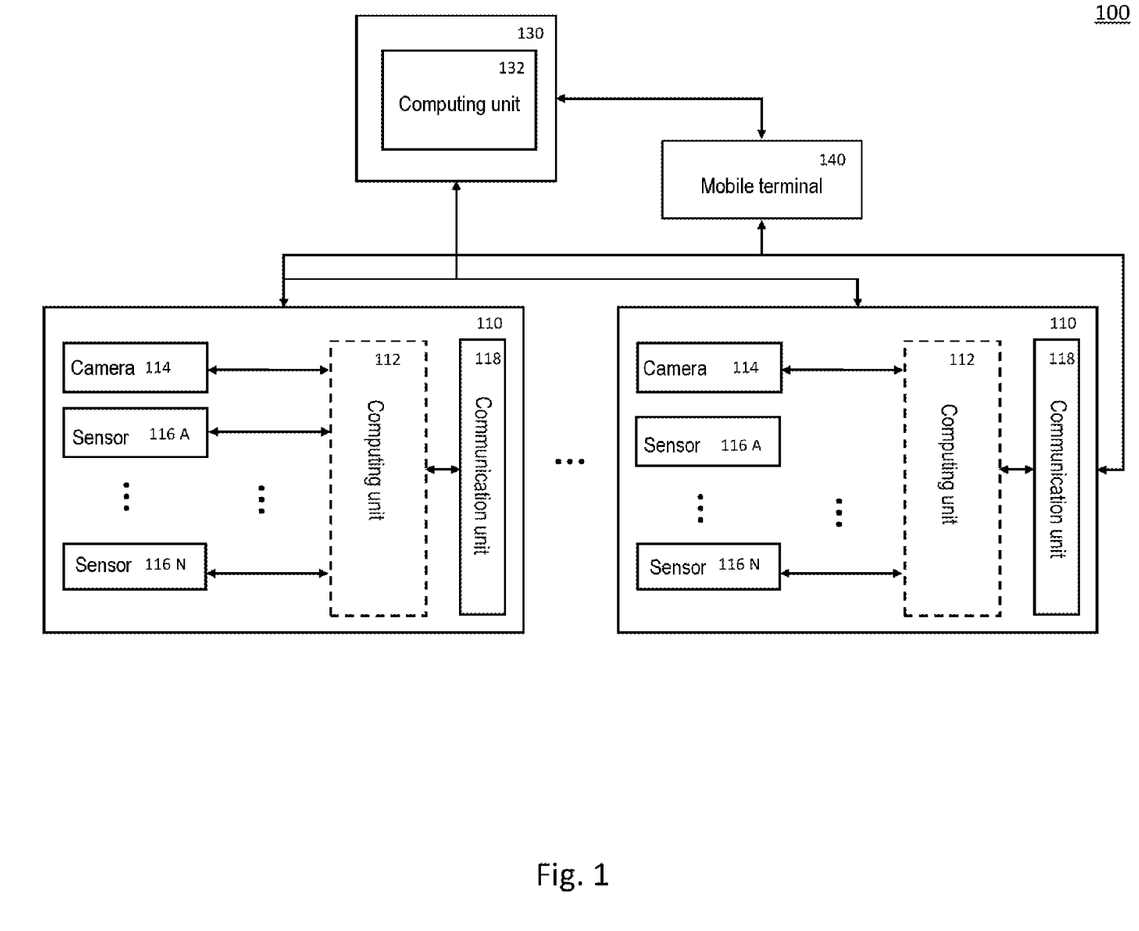
FIG. 1 shows a schematic system for automatically creating a video of a journey.

FIG. 1 schematically shows an exemplary system 100 for automatically creating a video of a journey of at least two vehicles 110. The method as described with reference to FIG. 4 may be implemented by the system 100.

The system comprises at least two vehicles 110. The term vehicle 110 comprises automobiles, trucks, buses, RVs, motorcycles, etc. that are used to transport people, goods, etc. The term in particular comprises motor vehicles for passenger transport. Motor vehicles comprise vehicles with an electric or at least partly electric drive.

Each vehicle 110 comprises at least one sensor 116A . . . 116N, which is set up to continuously capture technical driving parameters of the respective vehicle 110.

Preferably, the at least one sensor 116A . . . 116N comprises a position ascertainment sensor, with the continuous capture of technical driving parameters of the respective vehicle 110 comprising the capture of a geographic position of the respective vehicle 110.

To capture or ascertain the geographic position, a position ascertainment sensor may ascertain or capture current position data which with the aid of a navigation satellite system. The navigation satellite system may be any current or future global navigation satellite system (GNSS) for position determination and navigation by receiving signals from navigation satellites and/or pseudolites. By way of example, this may be the Global Positioning System (GPS), GLObal NAvigation Satellite System (GLONASS), Galileo positioning system and/or BeiDou Navigation Satellite System. In the example of GPS, the the position ascertainment sensor may comprise a GPS module which is set up to ascertain current GPS position data of the vehicle 110 or of the mobile terminal 140 belonging to—e.g., coupled to—a vehicle 110.

Moreover, the at least one sensor 116A . . . 116N may comprise an accelerometer. An accelerometer is a sensor which determines acceleration by measuring inertia acting on a mass or test mass. By way of example, the accelerometer may ascertain the acceleration, an increase or decrease in speed and/or a driving direction of the vehicle 110.

Moreover or as an alternative thereto, the at least one sensor 116A . . . 116N may comprise a gyro sensor. A gyro sensor is an accelerometer or relative position sensor that captures very small accelerations, rotational movements and/or a change in relative position of a mass or test mass. Data from the gyro sensor may be combined with position data from the position ascertainment sensor. By combining gyro sensor and position ascertainment sensor, it is possible for example to very accurately determine changes in direction of the vehicle 110.

An electronic controller may process all signals of the aforementioned sensor or sensors 116A . . . 116N and output appropriate control signals to suitable actuators. The aforementioned sensors 116A . . . 116N consequently capture technical driving parameters of each associated vehicle 110. Expressed differently, technical driving parameters comprise one or more of the data captured by the aforementioned sensors 116A . . . 116N.

The position ascertainment sensor of one vehicle 110 may be synchronous in time with the position ascertainment sensor of every other vehicle 110. By way of example, a time synchronization with an accuracy of, e.g., up to 0.1 s (seconds), 0.01 s or 0.001 s may be carried out for the at least two vehicles 110 at the start of every journey.

This is advantageous in that the video sequences recorded by the respective vehicles 110 are synchronous in time. Consequently, as explained in more detail below with reference to FIGS. 2A, 2B and 3, video sequences of a common journey recorded by different vehicles 100 may be combined automatically in time-synchronous fashion over the time axis on the basis of pre-definable or predefined criteria, in order to form a video.

Moreover, each vehicle 110 comprises at least one video camera 114 which is set up to record continuous video sequences of a predefinable length. In this case, continuously comprises, for example, during a journey, upon pre-defined events—e.g., from a start event—and/or upon pre-defined events. The length of the video sequences may be predefinable in different ways, for example may relate to the length of a journey, to a length defined by a user of the vehicle 110 (e.g., between active activation and deactivation of the video camera 114 by the driver and/or another user), etc.

The video camera 114, the at least one sensor 116A . . . 116N and/or the computing unit 112 may be fixedly integrated in the vehicle 110. The at least one video camera 114 may record videos of the respective vehicle surround. In this case, the video camera 114 may be arranged in the vehicle 110 in such a way that the video camera 114 records video sequences in the driving direction such that video sequences of a route traveled by the vehicle 110 may be recorded toward the front in the driving direction. Moreover, the vehicle 110 may comprise one or more further video cameras (not shown) which are set up to record continuous video sequences of a predefinable length. These video cameras may be arranged in the vehicle 110 in such a way that they are able to record video sequences of the driver of the vehicle 110 and/or of a further vehicle surround.

Moreover or as an alternative thereto, the video camera 114, at least one sensor 116A . . . 116N and/or the computing unit 112 may be integrated into the vehicle 110 via a mobile terminal 140. A mobile terminal 140 is a device that is capable of communicating wirelessly in a mobile network via local area networks (LANs), such as for example Wireless Fidelity (WiFi), or via wide area networks (WANs) such as for example Global System for Mobile Communication (GSM), General Package Radio Service (GPRS), Enhanced Data Rates for Global Evolution (EDGE), Universal Mobile Telecommunications System (UMTS), High Speed Downlink/Uplink Packet Access (HSDPA, HSUPA), Long-Term Evolution (LTE), fifth generation mobile radio networks (5G), or World Wide Interoperability for Microwave Access (WIMAX). Communication using other present or future communication technologies is possible. The term mobile terminal 140 in particular includes smartphones, but also other cellular telephones, personal digital assistants (PDAs), tablet PCs and all present and future electronic devices that are equipped with technology for loading and executing apps.

In this example, a mobile terminal 140 may be positioned in the vehicle 110 such that the front and/or rear camera 114 of the mobile terminal are/is able to record video sequences of the vehicle interior or driver and/or of the vehicle surround—as explained above with reference to the video camera 114 of the vehicle 110. By way of example, the mobile terminal 140 may be installed in the vehicle 110 such that the front camera of the mobile terminal 140 is able to record video sequences of the driver of the vehicle 110, whereas the rear camera of the mobile terminal 114 is able to record video sequences of the vehicle surround—for example toward the front in the driving direction. The mobile terminal 140 may be connected to the vehicle 110 in a wired and/or wireless manner.

The computing unit 112 may comprise the computing unit of the mobile terminal 140. The technical driving parameters may be captured at least by a sensor (not shown) of the mobile terminal 140. Moreover or as an alternative thereto, the technical driving parameters may be captured by at least one sensor 116A . . . 116N of the vehicle 110. The sensor data may be transmitted from the vehicle 110 to the mobile terminal 140 in a wired and/or wireless manner.

Moreover or as an alternative thereto, the computing unit 112 may be located in the vehicle 110. In this example, the technical driving parameters and/or the video sequences may be transmitted from the mobile terminal 140 to the computing unit 112 of the vehicle 110 in a wired or wireless manner.

Moreover or as an alternative thereto, a backend server 130 may comprise the computing unit 132. In this case, the technical driving parameters and the video sequences may be transmitted from the vehicle 110 and/or from the mobile terminal 140 to the backend server 130. In this example, the vehicle 110 and/or the mobile terminal 140 may comprise a communication module and a communication unit 118 (for the mobile terminal 140, not shown), respectively. The communication module 118 is capable of establishing a communication connection with other communication subscribers, for example other vehicles 110, the backend server 130, mobile terminals 140, etc., in order to transmit data.

The communication module 118 may be a subscriber identity module or a SIM card (not shown) that serves to establish a communication connection via a mobile radio system. The subscriber identity module in this case uniquely identifies the communication module 118 in the mobile radio network. The communication connection may be a data connection (for example packet transmission) and/or a wired communication connection (for example line transmission). A wireless communication connection with other communication subscribers via the communication module may also be established using other present and future technologies, for example local area networks (LANs) such as for example wireless LANs, etc.

The provision of the computing unit 132 via the backend server 130 is advantageous in that, following a common journey, a plurality of vehicles 110 may transmit the technical driving parameters and the recorded video sequences to the backend server 130, where these may then be processed together accordingly by the computing unit 132 and be automatically combined to form one or more suitable videos. In this case, the transmission of the technical driving parameters, the recorded video sequences and possible further relevant data may advantageously be implemented by way of a wireless access point (not shown) by way of a wireless communication connection, independently of the network coverage of the mobile radio network available at the respective time. The computing unit 132 of the backend server 130 may automatically create a suitable video for each vehicle 110 in a time synchronous manner.

The at least two vehicles 110 and/or the mobile terminal or terminals 140 belonging to the at least two vehicles may consequently be set up to transmit the technical driving parameters and the video sequences to the computing unit 132 of the backend server 130 during and/or a journey. This is advantageous in that the video sequences of a plurality of vehicles 110, which are assigned to a journey, may be collected, analyzed, marked and automatically assembled into a suitable video from a central location.

The computing unit 112, 132 is set up to process each of the video sequences with reference to the captured technical driving parameters.

Here, processing each video sequence comprises the ascertainment of a driving direction of each vehicle 110. To this end, the current position and the driving direction of each vehicle 110 is initially ascertained or calculated for all vehicles 110 associated with a journey from the sensor data. By way of example, the position may be ascertained by the position ascertainment sensor and the driving direction may be ascertained from the accelerometer in combination with the position ascertainment sensor and/or from the gyro sensor in combination with the position ascertainment sensor.

In a next step, a circle with radius r is calculated for each vehicle 110 around the ascertained geographic position of each vehicle 110.

In a next step, the greatest intersection between two calculated circles of the vehicles with the same ascertained driving direction is calculated in each case.

From these variables, it is possible to accurately ascertain which vehicle (Y) 110 was situated directly behind which vehicle (X) 110 at what time (t) during the journey. From the variables ascertained or calculated thus, it is possible to automatically identify those video sequences which were respectively recorded by the vehicle (Y) 110 situated directly behind the vehicle (X) 110 in the driving direction for said vehicle (X) 110 at all times during the journey, as will be explained in more detail below with reference to FIGS. 2A, 2B and 3. These may then automatically be combined to form a video.

Moreover, the computing unit 112, 132 is set up to mark each of the processed video sequences on the basis of predefinable criteria. Marking the processed video sequences may comprise marking each video sequence as belonging to a predeterminable or predetermined vehicle 110.

Each video sequence comprises a plurality of metadata. Automatically capturing and storing metadata regarding digital photo and video files is known. Metadata comprise for example a recording date of the respective image along a timeline of a video file. Metadata may furthermore comprise information about an orientation of the camera, a resolution, a GPS position, and the camera settings that are used, etc.

Processing each video sequence with reference to the captured technical driving parameters comprises complementing the metadata over the time axis with at least one technical driving parameter that was captured by the at least one sensor 116A . . . 116N. The term "over the time axis" in particular means that the metadata of the respective frames of a video sequence are complemented by the respective technical driving parameters in time synchronous fashion.

Advantageously, this allows video sequences belonging to a vehicle (X) 110 to be marked and consequently be related to one another automatically on the basis of the technical parameters. Claim 5

Advantageously, marking the video sequences may implement an automatic selection of the processed video sequences for the time-synchronous creation of the video of the journey of the vehicle (X) 110.

The computing unit 112, 132 is set up to automatically create a time-synchronous video on the basis of the markings.

It is thus advantageously possible to automatically create a video that contains video sequences of a vehicle (X) 110 to be analyzed, which at the time t are recorded directly by the vehicle (Y) 110 situated behind the vehicle to be analyzed. This facilitates a convenient analysis of the driving style of the driver of the vehicle (X) 110 to be analyzed.

Figure 2A:
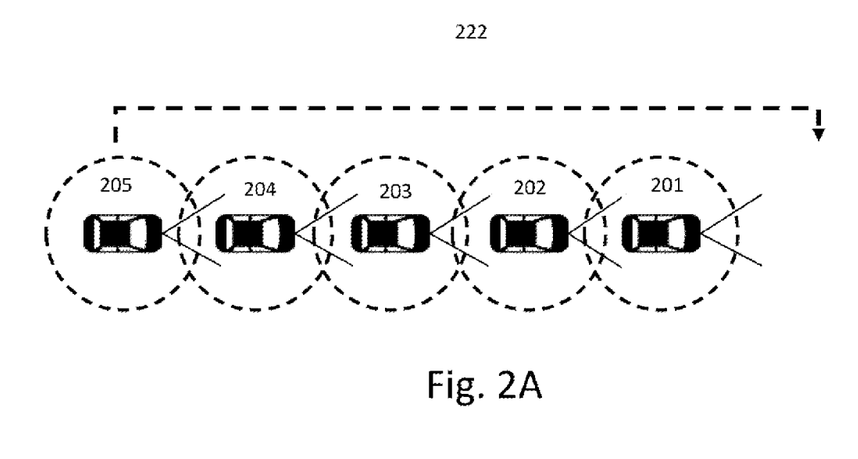
FIG. 2A schematically shows an exemplary position of five vehicles which are carrying out a common journey.

FIG. 2A schematically shows an exemplary system 100 as described with reference to FIG. 1, said system comprising five vehicles 201, 202, 203, 204, 205 carrying out a common journey.

The system 100 comprises the five vehicles 201, 202, 203, 204, 205 which carry out a common journey. By way of example, the five vehicles 201, 202, 203, 204, 205 may carry out a common journey in convoy in the driving direction on a racetrack (not shown). The common journey may also comprise one or more overtaking maneuvers of the vehicles 201, 202, 203, 204, 205. By way of example, a first vehicle 201 may initially travel on the racetrack as "first" vehicle, with the other vehicles 202, 203, 204, 205 following said first vehicle until in this example the last vehicle 205 wishes to carry out an overtaking maneuver 222.

Figure 2B:
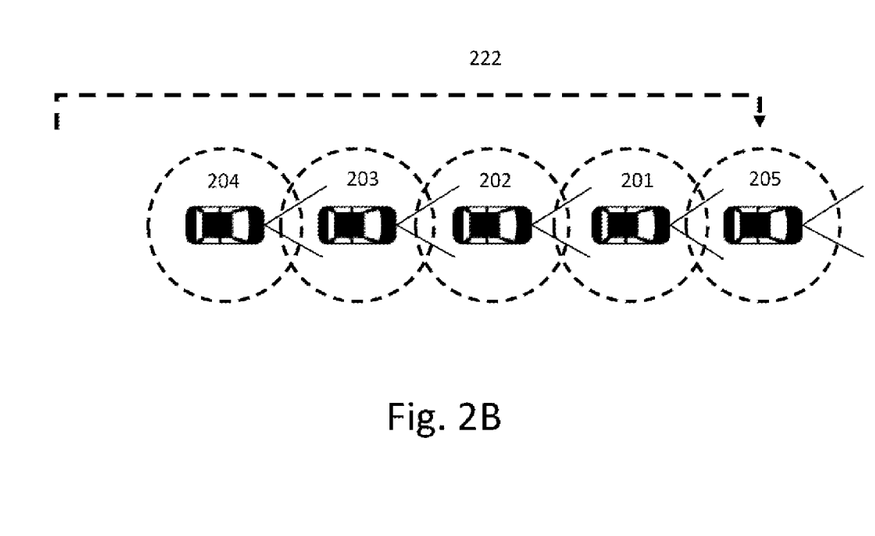
FIG. 2B shows an exemplary change in position during the common journey by the five vehicles.

FIG. 2B shows the five vehicles 201, 202, 203, 204, 205 after the last vehicle 205 has carried out the overtaking maneuver 222. After a predeterminable or predetermined interval and/or after a predeterminable or predetermined distance traveled (e.g., 1 kilometer, one or more laps, etc.), a following vehicle, the back or last vehicle 205 in the convoy in this example, may perform an overtaking maneuver 222 and overtake one or more of the vehicles 204, 203, 202, 201 ahead in order to return into a line—e.g., in front of the previous "first" vehicle 201—following the overtaking maneuver and adopt the position of the new "first" vehicle 205.

The drivers of the respective vehicles 201, 202, 203, 204, 205 and/or further persons may have an interest in analyzing the journeys of the respective vehicles 201, 202, 203, 204, 205. One option to this end may comprise displaying video sequences taken at a time t in the forward direction by vehicles respectively behind the vehicle of interest in the driving direction, since these video sequences allow conclusions to be drawn about the driven line of the respective vehicles taken along the path. To this end—depending on the number of overtaking maneuvers that are or were carried out during the journey—the video sequences recorded during the entire journey by the vehicle 110, 210, 220, 230, 240, 250 respectively behind the vehicle of interest are combined to form a video—independently of the number and the actual realization of the overtaking maneuvers.

The video is created by the computing unit 112, 132 in the vehicle 110, 210, 220, 230, 240, 250 or by the mobile terminal 140 or at the backend server 130.

Figure 3:
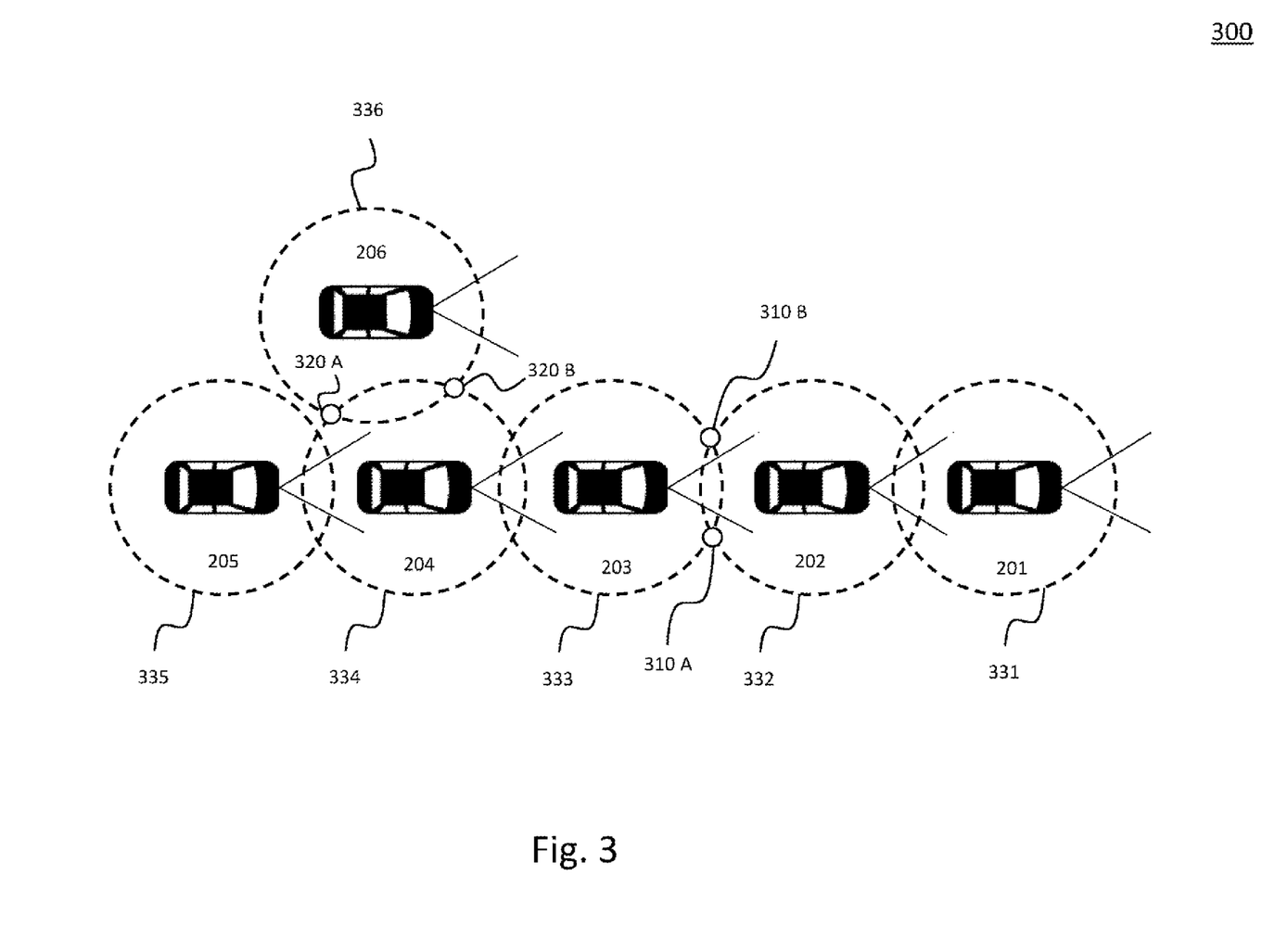
FIG. 3 shows an example for the calculation of a greatest intersection of two vehicles during a common journey comprising an overtaking maneuver.

FIG. 3 shows an example for ascertaining a greatest intersection of two vehicles at a certain time t during a common journey comprising an overtaking maneuver.

A circle with radius r 331, 332, 333, 334, 335, 336 is calculated or placed in each case around the geographic positions of the vehicles 201, 202, 203, 204, 205, 206 ascertained by the respective position ascertainment sensors of said vehicles—as described with reference to FIG. 1. Moreover, the current driving direction of the respective vehicles 201, 202, 203, 204, 205, 206 is calculated or ascertained. From this, the computing unit 112, 132 may ascertain that, for vehicle 202, the video recordings or video sequences of the vehicle 201 are irrelevant at the respective time since the vehicle 201 is situated geographically in front of the vehicle 202 and cannot record any video sequences of the vehicle 202 toward the front in the driving direction. Moreover, it is ascertained that the vehicles 203, 204, 205 and 206 are potentially relevant to vehicle 202 since these move in the same driving direction as the vehicle 202. Which circle 333, 334, 335, 336 around the potentially relevant vehicles 203, 204, 205 and 206 has a greatest intersection with the circle 332 around the vehicle 202 is ascertained in a next step. In this example, the circle 333 around the vehicle 203 with the points of intersection 310A and 310B has the greatest intersection with the circle 332 around the vehicle 202 in the same driving direction at the time t. Consequently, for the time t, the computing unit ascertains that the video sequences of the vehicle 203 are relevant for the vehicle 202 at the time t and automatically inserts these into the video for vehicle 202 at the time t along the time axis.

Figure 4:
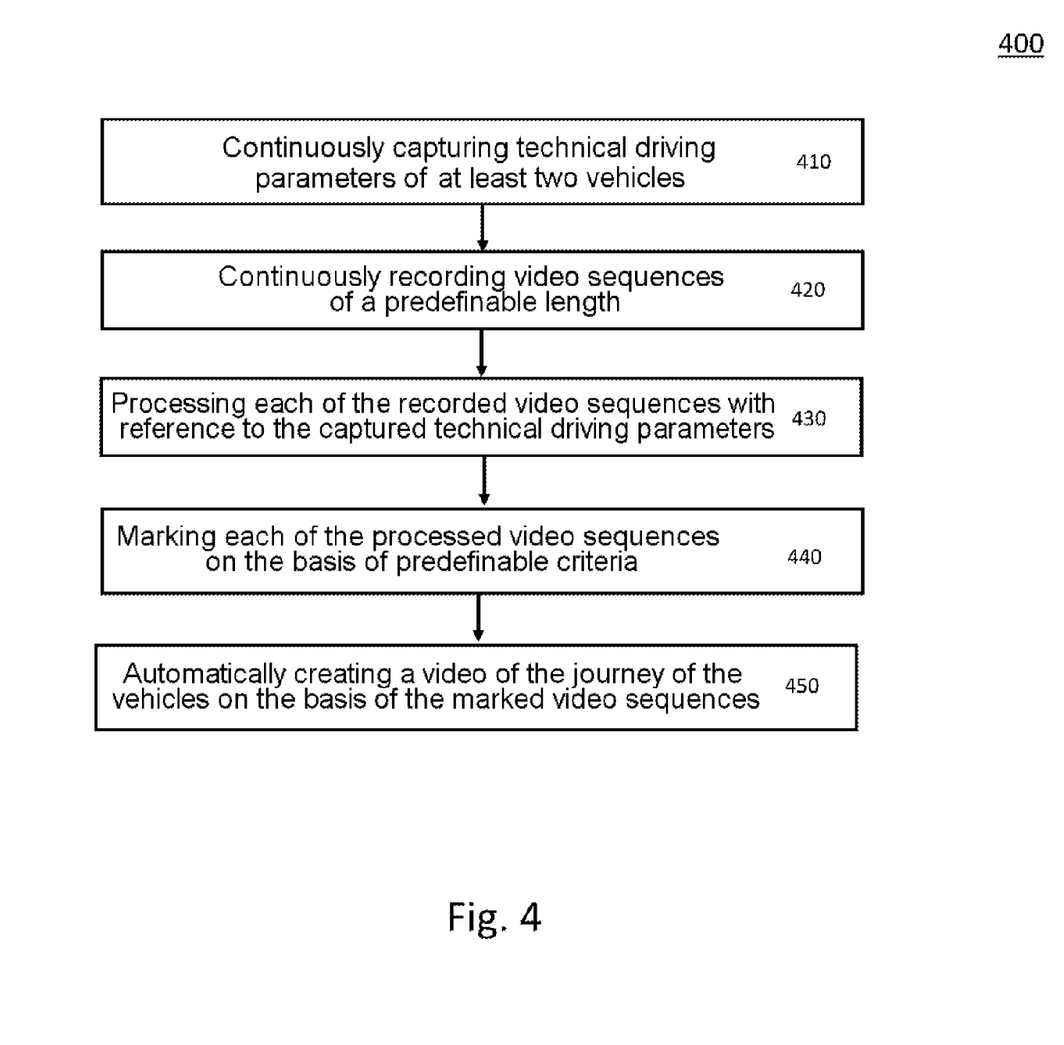
FIG. 4 shows an exemplary method for automatically creating a video of a journey.

FIG. 4 shows a flowchart which elucidates an exemplary method 400 for automatically creating a video 210 of a journey of at least two vehicles 110, 201, 202, 203, 204, 205. The method 400 may be implemented on a system 100 as described with reference to FIG. 1. The method steps of the method may be realized as described with reference to FIG. 1.

The method 400 comprises the following steps:

continuously capturing 410 technical driving parameters of the at least two vehicles 110, 201, 202, 203, 204, 205 by way of at least one sensor 116A . . . 116N of each vehicle 110, 201, 202, 203, 204, 205;

continuously recording 420 video sequences of a predefinable length by way of at least one video camera 114 of each vehicle 110, 201, 202, 203, 204, 205;

processing 430 each of the recorded video sequences with reference to the captured technical driving parameters by way of a computing unit 112, 132;

marking 440 each of the processed video sequences on the basis of predefinable criteria by way of the computing unit 112, 132; and automatically creating 450 a video of the journey of at least one vehicle 110, 201, 202, 203, 204, 205 on the basis of the marked video sequences by way of the computing unit 112, 132.

The at least one sensor 116A . . . 116N may comprise a position ascertainment sensor;

wherein the continuous capture 410 of technical driving parameters of the vehicle 110, 201, 202, 203, 204, 205 may comprise the capture of a geographic position of the respective vehicle 110, 201, 202, 203, 204, 205.

The position ascertainment sensor of one vehicle 110, 201, 202, 23, 204, 205 may be synchronous in time with the position ascertainment sensor of every other vehicle 110, 201, 202, 203, 204, 205.

The processing of each video sequence may comprise:
  ascertaining a driving direction of each vehicle 110, 201, 202, 203, 204, 205;
  calculating a circle 331, 332, 333, 334, 335 with the radius r around the ascertained geographic position of each vehicle 110, 201, 202, 303, 204, 205; and
  calculating a greatest intersection between in each case two calculated circles 331, 332, 333, 334, 335 of vehicles 110, 201, 202, 203, 204, 205 with the same ascertained driving direction.

Marking 440 the processed video sequences may comprise marking each video sequence as belonging to a determinable vehicle 110, 201, 202, 203, 204, 205.

Figure 5:
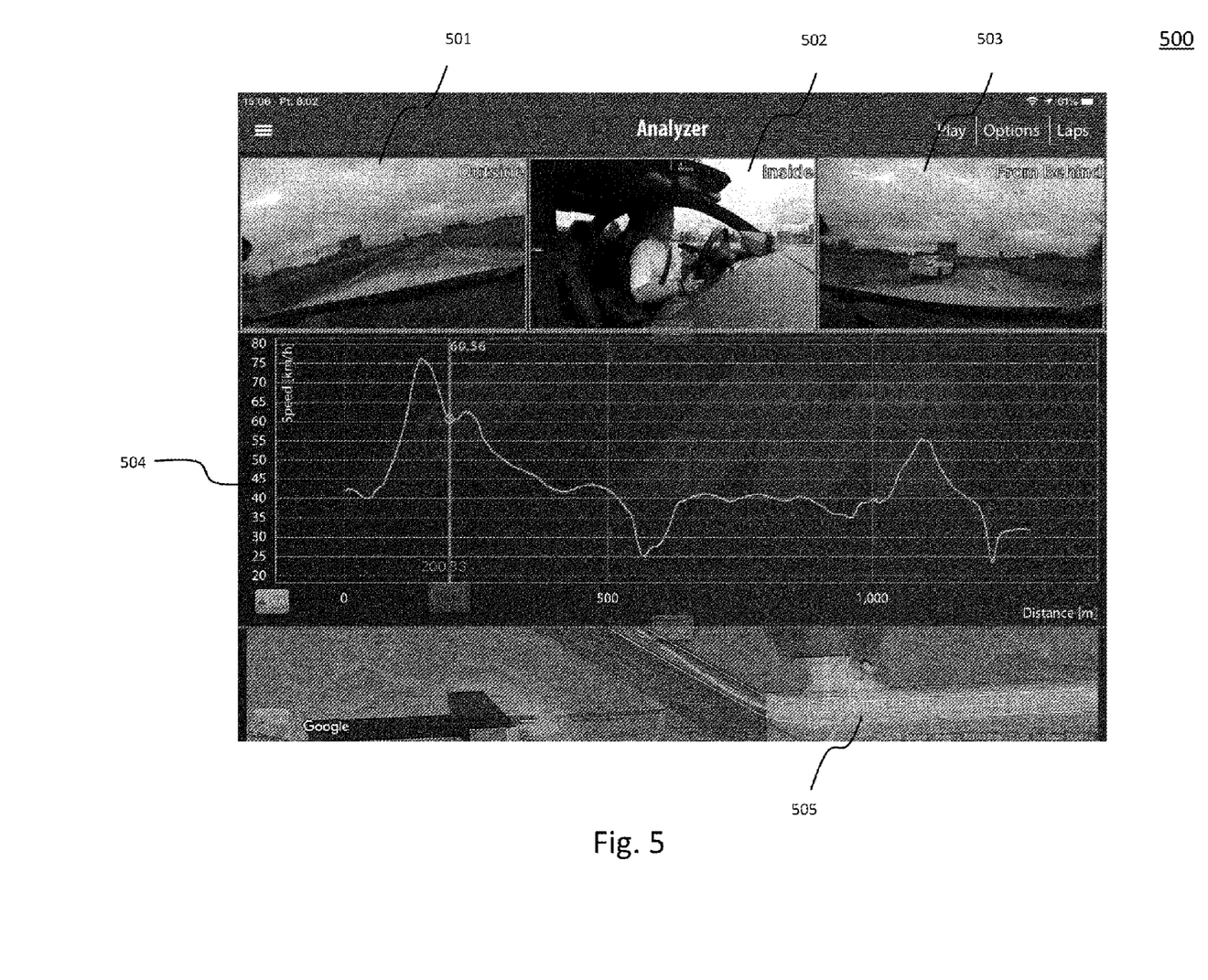
FIG. 5 shows an exemplary illustration of an automatic creation of a video of a journey for a certain vehicle.

FIG. 5 shows an example illustration of a video 500 automatically created in time-synchronous fashion for a certain vehicle 110, as described above with reference to FIGS. 1 to 4.

The view or the window 501 shows a view of the vehicle 110 to the front, as was recorded, for example, by a video camera installed in the vehicle 110 and/or a mobile terminal 140 assigned to the vehicle 110.

The view or the window 502 shows a view of the driver of the vehicle 110, as was recorded, for example, by a video camera installed in the vehicle 110 and/or a mobile terminal 140 assigned to the vehicle 110.

The view or the window 503 shows a view of the vehicle 110 from the back, as was recorded at the current or displayed time t by the vehicle 110-X situated behind the vehicle 110 at this time by a video camera installed in the vehicle 110-X and/or a mobile terminal 140 assigned to the vehicle 110-X.

The view or the window 504 shows a curve of the speed of the vehicle 110 in km/h over the course of the distance in m traveled by the vehicle 110. This can be ascertained by appropriate evaluation of technical driving parameters at the time t.

The view or the window 505 shows the current geographic position of the vehicle 110 at the time t along the path traveled, as may arise from the position ascertainment sensor 110 of the vehicle at the time t.

What is claimed is:
1. A system for automatically creating a video of a journey, the system comprising:
  at least two vehicles, each vehicle comprising:
    at least one sensor which is configured to continuously capture technical driving parameters of the vehicle; and at least one video camera which is configured to record continuous video sequences of a predefinable length; and at least one computing unit which is configured to:
process the video sequences with reference to the technical driving parameters;
mark each of the processed video sequences with a marking based on predefinable criteria; and
automatically create a video based on the markings, wherein:

the at least one sensor comprises a position ascertainment sensor;

the continuous capture of the technical driving parameters of the vehicle comprises a capture of a geographic position of the vehicle; and processing of each of the video sequences comprises:
ascertaining a driving direction of each vehicle;
calculating a circle with a radius around the geographic position of each vehicle; and
calculating a greatest intersection between two calculated circles of vehicles with a same ascertained driving direction.

2. The system according to claim 1, wherein the position ascertainment sensor of each vehicle is synchronous in time with the position ascertainment sensor of every other vehicle.

3. The system according to claim 1, wherein marking each of the processed video sequences comprises marking each of the processed video sequences as belonging to a determinable one of the vehicles.

4. A method for automatically creating a video of a journey of at least two vehicles, the method comprising:

continuously capturing technical driving parameters of the at least two vehicles by at least one sensor of each vehicle;

continuously recording video sequences of a predefinable length by at least one video camera of each vehicle;

processing each of the recorded video sequences with reference to the captured technical driving parameters by a computing unit;

marking each of the processed video sequences based on predefinable criteria by the computing unit; and automatically creating a video of a journey of at least one of the vehicles based on the marked video sequences by the computing unit, wherein:

the at least one sensor comprises a position ascertainment sensor;

continuously capturing the technical driving parameters of the vehicle comprises capturing a geographic position of the vehicle; and the processing of each of the video sequences comprises:
ascertaining a driving direction of each vehicle;
calculating a circle with a radius around the geographic position of each vehicle; and
calculating a greatest intersection between two calculated circles of vehicles with a same ascertained driving direction.

5. The method according to claim 4, wherein the position ascertainment sensor of one vehicle is synchronous in time with the position ascertainment sensor of every other vehicle.

6. The method according to claim 4, wherein marking each of the processed video sequences comprises marking each of the processed video sequences as belonging to a determinable one of the vehicles.

* * * * *